(12) United States Patent
Steinert (10) Patent No.: US 10,563,751 B2
(45) Date of Patent: Feb. 18, 2020

(54) COOLING APPARATUS FOR CONTINUOUSLY VARIABLE TRANSMISSIONS

(71) Applicant: Excel Industries, Inc., Hesston, KS (US)

(72) Inventor: Royce A. Steinert, Hutchinson, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 289 days.

(21) Appl. No.: 15/491,821

(22) Filed: Apr. 19, 2017

(65) Prior Publication Data

US 2018/0306309 A1 Oct. 25, 2018

(51) Int. Cl.
  *F16H 57/04* (2010.01)
  *F16H 9/18* (2006.01)
  *F16H 57/035* (2012.01)
  *F16H 57/027* (2012.01)

(52) U.S. Cl.
  CPC .......... *F16H 57/0489* (2013.01); *F16H 9/18* (2013.01); *F16H 57/027* (2013.01); *F16H 57/035* (2013.01); *F16H 57/0416* (2013.01)

(58) Field of Classification Search
  CPC ...... F16H 9/18; F16H 57/0489; F16H 57/027; F16H 57/035; F16H 57/0416
  See application file for complete search history.

(56) References Cited

U.S. PATENT DOCUMENTS

| | | | |
|---|---|---|---|
| 3,924,963 A | 12/1975 | Zerrer | |
| 4,671,781 A | 6/1987 | Tanaka et al. | |
| 4,671,782 A | 6/1987 | Ochiai et al. | |
| 4,697,665 A | 10/1987 | Eastman et al. | |
| 4,846,258 A | 7/1989 | Charles | |
| 5,489,186 A | 2/1996 | Yapp et al. | |
| 6,182,784 B1 | 2/2001 | Pestotnik | |
| 6,823,956 B2 | 11/2004 | Shimizu | |
| 7,070,527 B1 | 7/2006 | Saagge | |
| 7,427,248 B2 | 9/2008 | Chonan | |

(Continued)

FOREIGN PATENT DOCUMENTS

| | | |
|---|---|---|
| EP | 2837850 A1 | 2/2015 |
| FR | 2829885 A1 | 3/2003 |

(Continued)

OTHER PUBLICATIONS

NVidia Maxwell 'Turbo Fan' Reference Cooler Patent Surfaces www.gamersnexus.net (Jun. 2, 2014 http://www/gamersnexus.net/news-pc/1488-nvidia-maxwell-turbo-fan-cooler.

(Continued)

*Primary Examiner* — Michael R Mansen
*Assistant Examiner* — Robert T Reese
(74) *Attorney, Agent, or Firm* — Shook, Hardy & Bacon, LLP (57) ABSTRACT

Embodiments for a cooling apparatus for a continuously variable transmission are provided. The cooling apparatus includes a housing that may enclose a drive assembly, a driven assembly, and a belt of the continuously variable transmission. A fan may pull air into the housing via an intake opening. The air may be circulated around the enclosed components and exhausted through an output opening of the housing.

19 Claims, 5 Drawing Sheets

(56) References Cited

U.S. PATENT DOCUMENTS

| | | |
|---|---|---|
| 7,625,276 B2 | 12/2009 | Kim et al. |
| 8,439,019 B1 | 5/2013 | Carlson et al. |
| 8,459,967 B2 | 6/2013 | Kleber |
| 8,596,406 B2 | 12/2013 | Itoo et al. |
| 8,677,971 B2 | 3/2014 | Benham |
| 8,776,930 B2 | 7/2014 | Tadych et al. |
| 8,840,496 B2 | 9/2014 | Yamanishi et al. |
| 8,875,822 B2 | 11/2014 | DeWeerdt |
| 8,950,290 B2 | 2/2015 | Dieter et al. |
| 9,181,850 B2 | 11/2015 | Roby |
| 2006/0027192 A1* | 2/2006 | Tsukada ............... B60K 1/00 123/41.7 |
| 2006/0270503 A1 | 11/2006 | Suzuki et al. |
| 2013/0090199 A1* | 4/2013 | Itoo et al. ........... F16H 57/0416 474/93 |
| 2014/0301839 A1 | 10/2014 | Funabashi et al. |
| 2015/0024890 A1* | 1/2015 | Eberhardt ........... F16H 57/0416 474/144 |
| 2015/0308561 A1 | 10/2015 | Itoo et al. |
| 2015/0377341 A1* | 12/2015 | Renner ............... F16H 57/0489 474/93 |
| 2016/0061314 A1* | 3/2016 | Kuhl ................... F16H 57/0489 474/8 |
| 2017/0045134 A1* | 2/2017 | Wade ..................... F04D 25/02 |
| 2018/0245682 A1* | 8/2018 | Davis .................. F16H 57/0416 |

FOREIGN PATENT DOCUMENTS

| | | |
|---|---|---|
| IE | 20317171 U1 | 2/2004 |
| JP | 2560793 B2 | 12/1996 |
| WO | 2009066323 A2 | 5/2009 |

OTHER PUBLICATIONS

Cool Belt CVT Belt Cooling System for Polaris RZR 1000 www.proutvparts.com (Dec. 24, 2014) http://www/proutvparts.com/products/cool-belt-cvt-belt-cooling-system-for-polaris-rzr-1000.

"UTV Inc Artic Cat Wildcat Clutch Cooling Fan Kit" www.utvinc.com https://www.utvinc.com/ledlightbars/utvincarctic-catwildcatclutchcoolingfankit/.

\* cited by examiner

COOLING APPARATUS FOR CONTINUOUSLY VARIABLE TRANSMISSIONS

FIELD

Aspects provided relate to embodiments for a cooling apparatus for a continuously variable transmission ("CVT"). More particularly, aspects herein relate to a cooling apparatus having a fan and a housing that encloses one or more components of the CVT.

BACKGROUND

CVTs are commonly used in off-road vehicles, such as utility task vehicles (UTVs), recreational off-highway vehicles (ROVs), multipurpose off-highway utility vehicles (MOHUVs), snowmobiles, and all-terrain vehicles (ATVs), among others. CVTs utilized in such vehicles often rely on a belt, chain, or similar mechanical drive transfer mechanism to transmit power from a power source (such as an engine) to the CVT. For example, a belt may connect a primary clutch mounted to an output shaft of an engine to a secondary clutch mounted to an input shaft of CVT. Continuing with this example, the belt is driven by the primary clutch to transfer power to the secondary clutch coupled with the CVT, which, in turn, regulates the propulsion of the vehicle. As the belt rotates, friction from the CVT heats the belt. Conventional solutions provided limited means of displacing the heat surrounding the belt and other components, potentially resulting in a shortened useful lifetime, failure, and frequent replacement. Additionally, some previous CVT cooling solutions relied on air from outside of the vehicle for cooling, potentially introducing dust, debris, water, and other particulate matter to the CVT and engine components of the vehicle.

SUMMARY

Aspects provided herein relate to a cooling apparatus for vehicles having continuously variable transmissions (CVTs). The cooling apparatus may include a housing that encloses at least a portion of the CVT and engine components, which may include, for example, an output shaft, a drive assembly, a driven assembly, and/or a belt. The cooling apparatus may include a fan enclosed in the housing that is coupled with the output shaft to draw ambient air into the housing via an intake opening. In some aspects, the fan may be an axial-centrifugal fan, which has blades oriented to both force air into the housing and to circulate the air through the housing. The orientation of the fan blades may draw air into the housing through the intake opening axially, or in a direction generally parallel a first rotational axis (which may be a rotational axis of the output shaft and/or the fan). Once the air is introduced to the housing, the orientation of the fan blades may also direct the air outwardly away from the first rotational axis to circulate air around the CVT components within the housing. Additionally, the fan may force the air out of the housing via an output opening that is positioned at an opposite end of the housing from the intake opening. Further, the output opening may be oriented such that the exhausted air is directed away from the CVT and around parts of the engine (e.g., engine exhaust) to remove heat buildup around the engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of various embodiments herein is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein, and may have various components hidden to aid in the written description thereof.

One exemplary embodiment provides for a cooling apparatus for a vehicle having a continuously variable transmission ("CVT"). A CVT can generate heat as the CVT converts power from a power source, such as an engine, into variable speed/rotational energy that the vehicle then translates into motion. The heat generated by the CVT can, in some situations, reduce a useful of life of CVT and engine components, such as a belt connecting CVT components. Therefore, aspects hereof provide a cooling apparatus including a housing that encloses at least a portion of a drive assembly and a driven assembly of the vehicle and CVT. The cooling apparatus may also include a fan to draw in air on the drive side (e.g., power source side) of the system in a way that causes the air to flow around and interact with components on the drive side (e.g., pulleys and the belt portion at the drive side at any given point) as well as to interact with components on the driven side. The interaction of the air with the various components allows for thermal energy generated and/or retained by those components to be displaced and/or dissipated by the circulating air to reduce undesired effects (e.g., potential reduced longevity) caused by the thermal energy. The air is then exhausted away from the cooling apparatus to prevent recirculation of the thermally enhanced exhaust air back into the system.

As will be discussed in greater detail below, the cooling operation may be accomplished with an axial-centrifugal fan that draws air into the housing along a first rotational axis and expels air through the housing in a direction that is radially offset from the first rotational axis. The axial intake and radial dispersion from the fan can enhance cooling efficiencies through enhanced interactions with the enclosed components and/or limiting obstruction of air flow from one or more components axially aligned (e.g., pulley) and in the fluid flow direction of the fan. Stated differently, an axial-centrifugal fan, in an exemplary aspect, is an efficient mechanism to draw air into the housing and move the air around components that may traditionally disrupt airflow generated by a non-axial-centrifugal fan. Further, an axial-centrifugal fan may diminish undesired air flow turbulence created by other types of fans, thereby improving the airflow beneath the fan and increasing cooling effects. Still further, use of the axial-centrifugal fan in conjunction with certain housing shapes may allow for a more efficient cooling system that enhances the airflow characteristics generated by the axial-centrifugal fan, as will be provided hereinafter.

The housing may be sized to enclose at least a portion of the CVT and power source components, including a drive assembly, a driven assembly, and a belt. The housing may have a drive-side chamber and a driven-side chamber. The drive-side chamber may be sized to enclose at least a portion of the drive assembly and the fan. The drive-side chamber may have a first portion surrounding an intake opening in an intake side of the housing. The intake opening may be aligned with an inlet side of the fan to draw ambient air into the housing. The first portion may be dome-shaped to fit about the fan and may be connected with the second portion that extends to an output side of the housing.

The driven-side chamber may be sized to enclose at least a portion of the driven assembly. The driven-side chamber has an output duct at least partially surrounding an output opening in an output side of the housing. In some embodiments, the output duct may have a surface that tapers away from the intake side of the housing toward the output side of the housing to direct discharged air away from the CVT.

The fan may be affixed to an output shaft of a power source, such as an internal combustion engine, at the drive assembly. The fan has an inlet side and a discharge side positioned opposite the inlet side. The fan has a plurality of blades that curve or extend diagonally along a shroud connecting the inlet side and the discharge side. Accordingly, the fan (which may be an axial-centrifugal fan) draws air into the inlet side in an axial direction and forces the air out of the discharge side in both the axial and a centrifugal direction. The discharge side may have a diameter that is greater than a diameter of the inlet side (and the housing may optionally be similarly configured to match the fan) to alter air pressures or velocities according to known principles, such as Bernoulli's equation and fan laws.

The first portion of the drive-side chamber may enclose a portion of the fan and the intake opening may be aligned with the inlet side of the fan. Accordingly, the housing allows for access to ambient air via the intake opening, which is drawn into the housing by the fan and circulated around the enclosed components. As the fan forces the ambient air into the housing, a pressure differential is formed relative to ambient conditions causing a volume of air within the housing that surrounds the enclosed components to be forced out of the housing via the output opening. The discharged air is directed away from the housing in the direction of the output side, in an exemplary aspect. In some aspects, the output opening may be oriented such that the discharged air is directed around various components of the power source and away from the vehicle and/or a passenger occupancy portion. In addition to differing the diameters of the intake and output portions of the fan, the housing shape may also be designed to alter air pressures and velocities as the cooling air approaches CVT components.

Figure 1:
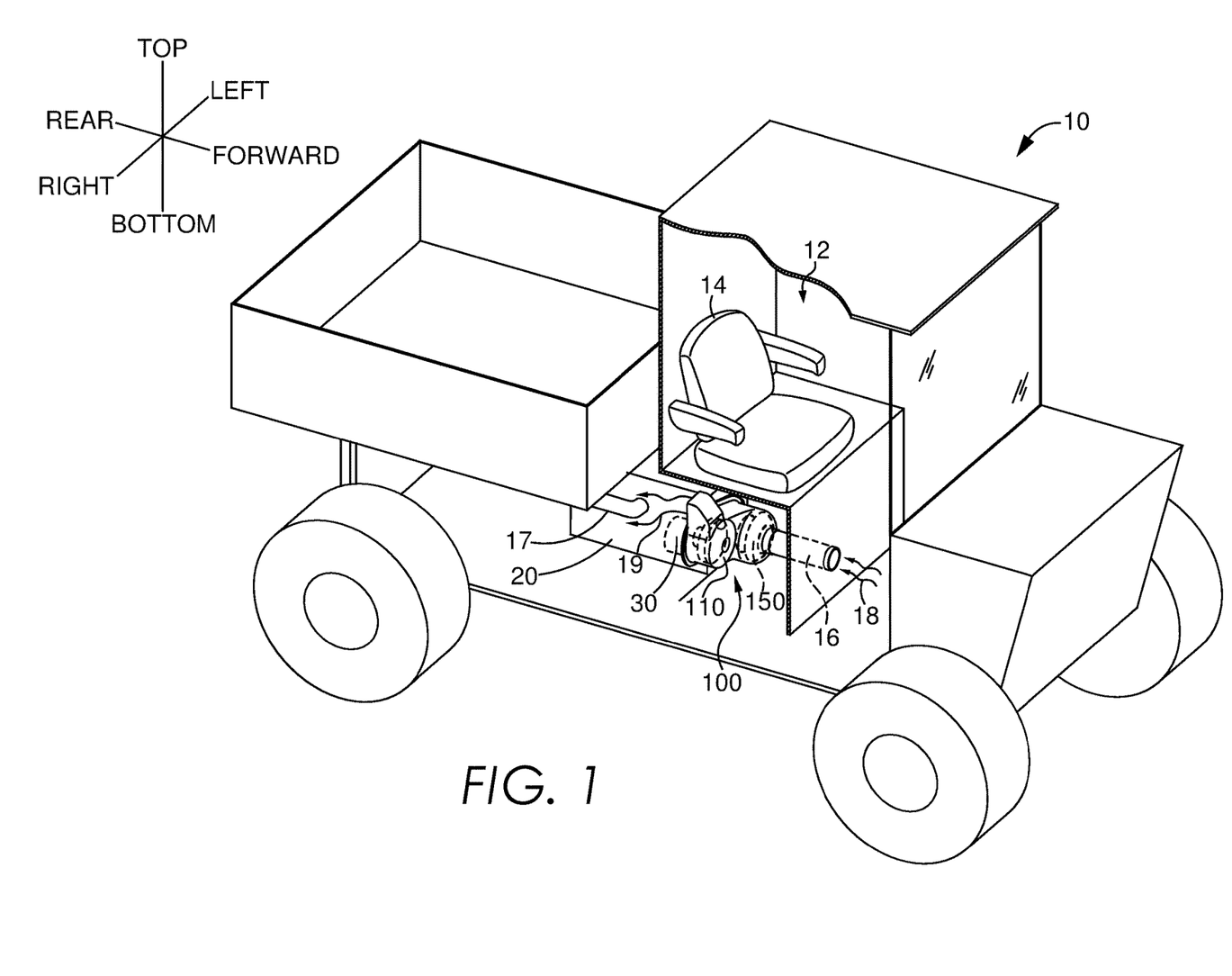
FIG. 1 is a perspective view of an exemplary vehicle having a CVT with an exemplary cooling apparatus, in accordance with aspects hereof.

Turning now to FIG. 1, an exemplary vehicle 10, in this case a UTV, is depicted with a CVT 30 and a cooling apparatus 100. It should be understood that the vehicle 10 is exemplary only, and the cooling apparatus 100 may be implemented with any type of vehicle. For example, the cooling apparatus 100 may be implemented on all-terrain vehicles (ATVs), recreational off-highway vehicle (ROVs), recreational utility vehicles (RUVs), etc. Further, it should be appreciated that the embodiments provided herein may be employed on tracked vehicles (such as snowmobiles), watercraft, and any other type of vehicle that employ CVTs or similar components. As the classification or nomenclature of vehicles may vary, the classification or types of vehicles in this disclosure are not intended to be limiting.

The vehicle 10 comprises a power source 20 that is drivingly coupled with the CVT 30. In one exemplary aspect, the power source 20 may be a forward-facing engine, and the cooling apparatus 100 may be configured for use with the forward-facing engine. To the extent that directional terminology is used herein, unless indicated otherwise, such terminology refers to the orientation of aspects of the invention according to the directions as depicted in FIG. 1 (forward, rear, top, bottom, left and right). Although the figures depict exemplary structural arrangements of the vehicle components and cooling apparatus 100, it should be understood that the embodiments described herein are not limited to a particular structural arrangement, unless specifically indicated. Rather, it should be understood that other configurations are possible without departing from the spirit or scope herein.

The cooling apparatus 100 may include a housing 110 and a fan 150. The housing 110 may enclose various components of the CVT 30 and the power source 20, for example, an output shaft, clutches, driven and drive pulleys, and a belt, among others. The fan 150 is positioned within housing 110, draws ambient air 18 into the housing 110, and circulates air through the housing 110 to dissipate heat generated during operation of the vehicle 10. Additionally, the cooling apparatus 100 forces discharge air 19 out of the housing 110 and away from the CVT 30.

In an exemplary embodiment, the housing 110 is in fluid communication with a cab 12 of the vehicle 10. In one aspect, an intake duct 16 may be coupled with the housing 110 and the cab 12. Accordingly, the intake duct 16 may be positioned to draw ambient air 18 from within the cab 12. In other aspects, the housing 110 may be directly coupled with the cab 12 (e.g., an operator cabin) to access the ambient air 18. Because the ambient air 18 may be relatively free of particulate matter as a result of protection from particulate matter provided by the cab, the intake duct 16 may utilize a more permeable filtration mechanism (such as membrane-like filter), as compared to less permeable, traditional air filters. Implementation of a more permeable filtration mechanism may increase the volume of the ambient air 18 that may move through the intake duct 16. Accordingly, drawing ambient air 18 from within the cab 12, for example at a location under seat 14, may allow the ambient air 18 to be drawn into the cooling apparatus 100 with minimal resistance.

Additionally, the discharge air 19 may be directed out of the housing 110 such that the discharge air 19 flows around one or more components of other components in the vehicle 10. For example, the housing 110 may direct the discharge air 19 around an engine exhaust 17 of the power source 20. The engine exhaust 17, and other components of the power source 20, may be significant sources of heat. The discharge air 19 may be cooler than the air surrounding such components. Accordingly, configuring the housing 110 to direct the discharge air around these components may dissipate heat generated by the power source 20 and move the thermal energy away from the vehicle 10, providing an added benefit beyond merely cooling the CVT and related components.

Figure 2:
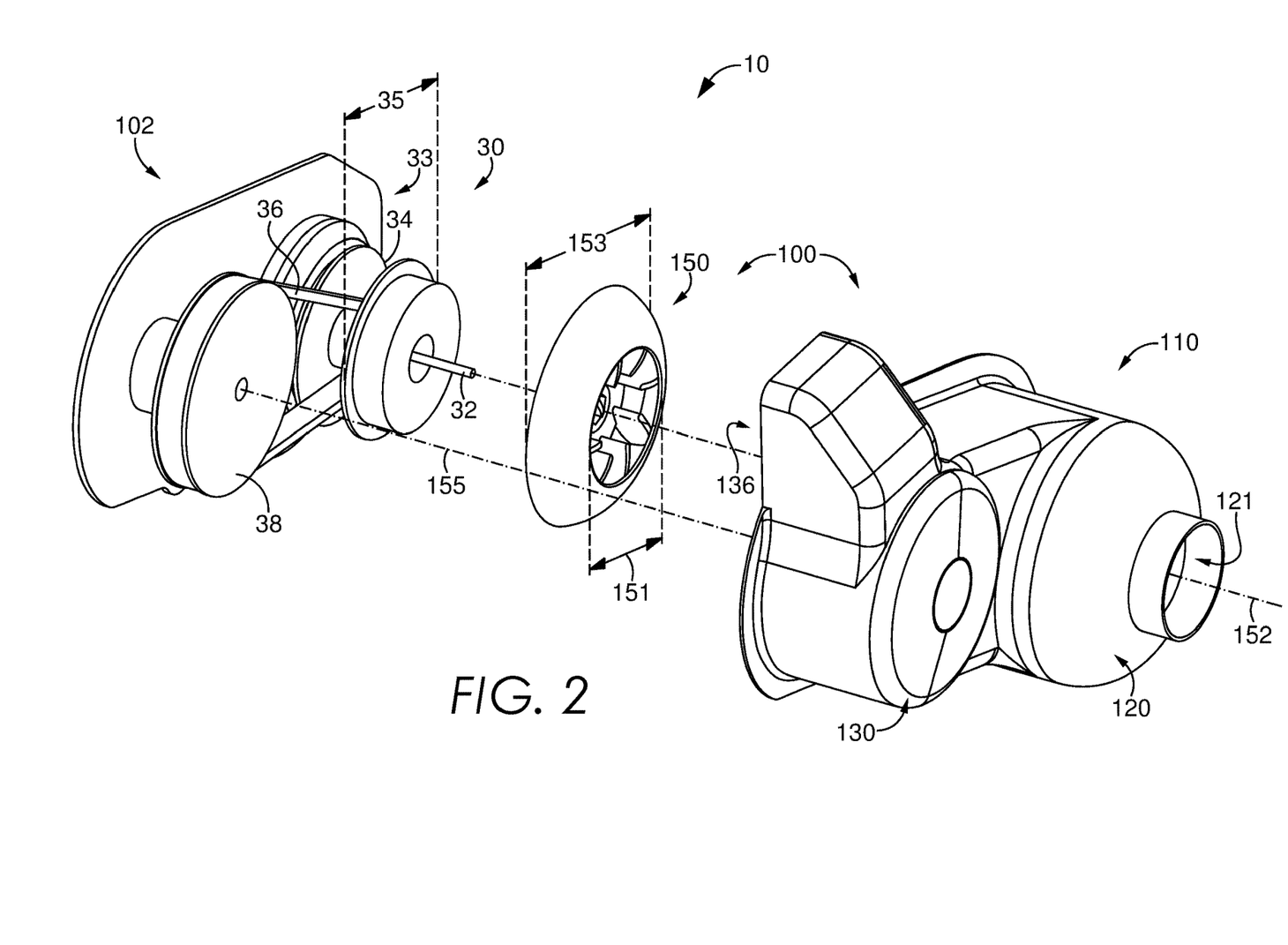
FIG. 2 is a close-up, partially exploded perspective view of selected components of the CVT and the exemplary cooling apparatus, in accordance with aspects hereof.

FIG. 2 shows a partially exploded view of an exemplary cooling apparatus 100 with a drive assembly 33 and a driven assembly 38 of the CVT 30. The drive assembly 33 may include a pulley set coupled with an output shaft 32 of the power source (such as the power source 20 in FIG. 1). For example, the drive assembly 33 may comprise a drive pulley 34, having a drive pulley diameter 35, coupled to the output shaft 32. Further, the drive assembly 33 may be drivingly coupled with the driven assembly 38, for example, via a belt 36. For convenience, as used herein, the term "belt" refers to any suitable drive transfer component, such as rubber drive belts, metal drive belts, chains, and any other mechanical drive transfer mechanisms.

FIG. 2 additionally depicts an embodiment of a fan 150, which may be an axial-centrifugal fan. However, it should be appreciated that other suitable fans may be implemented with the cooling apparatus 100 without departing from the spirit of this disclosure. The fan 150 may be mounted to the output shaft 32, such that a rotational axis of the fan 150, which may also be referred to herein as a first rotational axis 152, is coaxial with an axis of rotation of the output shaft 32. Accordingly, in this aspect, the fan 150 rotates with the output shaft 32, even when the vehicle is at rest, such as when the vehicle is in park or neutral. Said another way, as long as the power source 20 is generating power (e.g., a crankshaft within an internal combustion engine is rotating in a power-generating manner), the cooling apparatus 100 continues to cool the CVT 30. For example, this may occur even if the vehicle is not being propelled by the power source 20 (e.g., the engine is producing power but the CVT is preventing the power from being converted to vehicle motion).

Additionally, the fan 150 may have a discharge-side diameter 153 and an inlet-side diameter 151, allowing for improved air flow pressure and velocity characteristics. In some aspects, the discharge-side diameter 153 may be greater than the drive pulley diameter 35. Accordingly, air from the fan 150 may be circulated around the entire circumference of the drive assembly 33 to cool the drive pulley 34, and other components of the drive assembly 33 without being obstructed by the drive pulley 34. Stated differently, air exiting the fan 150 has a greater diameter than the drive pulley diameter 35, and, therefore, is allowed to flow past/around the pulley to effectively circulate and dissipate thermal energy.

The cooling apparatus 100 also includes a housing 110 that provides an enclosure for the fan 150 and the one or more CVT components discussed above. The housing 110 may include a drive-side chamber 120 and a driven-side chamber 130. The drive-side chamber 120 may be sized to enclose, at least in part, the drive assembly 33 and the fan 150. The drive-side chamber 120 may include an intake opening 121 that allows air to be drawn into the housing 110. The intake opening 121 may be aligned with the fan 150. For example, in one aspect, the first rotational axis 152 may extend through the intake opening 121 proximate a center portion of the intake opening 121. However, it should be understood that the exact detail or structure of the fan 150 and the intake opening 121 may be modified without departing from the spirit or scope herein. For example, the intake opening 121 may be positioned at another location in or proximate the drive-side chamber 120 without departing from the scope contemplated herein.

The driven-side chamber 130 may be sized to enclose at least a portion of the driven assembly 38. In some aspects, the driven-side chamber 130 may have a shape that curves around a second rotational axis 155, which may be a rotational axis of the driven assembly 38. Additionally, the driven-side chamber 130 may have an output opening 136 for directing air out of the housing 110. The housing 110 may be coupled with a mounting plate 102 such that an airtight seal, or a substantially airtight seal, is created between the housing 110 and the mounting plate 102.

Accordingly, the housing 110 encloses a first volume of air surrounding the drive assembly 33, the belt 36, and the driven assembly 38. The fan 150 draws ambient air into the housing 110, which increases air pressure within the housing 110. The fan 150 rotates continuously with the power source generating power, preventing air from exiting the housing 110 at the drive-side chamber 120. The output opening 136, which may be positioned on the opposite end (and side) of the housing 110 from the intake opening 121, provides an opening for the air within the housing 110 to exit the housing as the fan 150 displaces the existing air with ambient air. As a result, the cooling apparatus 100 creates a flow-field that encompasses the entirety of the drive assembly 33, the belt 36, and the driven assembly 38, in the depicted example.

As can be appreciated, this process is continuous, in that each time the first volume of air contained within the housing 110 is replaced by a second volume of ambient air drawn into the housing 110, a cycle is completed. As each cycle of this continuous cycle process is completed, heat (e.g., thermal energy) within the housing 110 is dissipated, and forced out of the housing 110 via the output opening 136. In one aspect, the output opening 136 extends beyond the mounting plate 102 and is positioned radially beyond the driven assembly 38. As a result, the air circulates around each of the enclosed components, including the driven assembly 38.

Figure 3A:
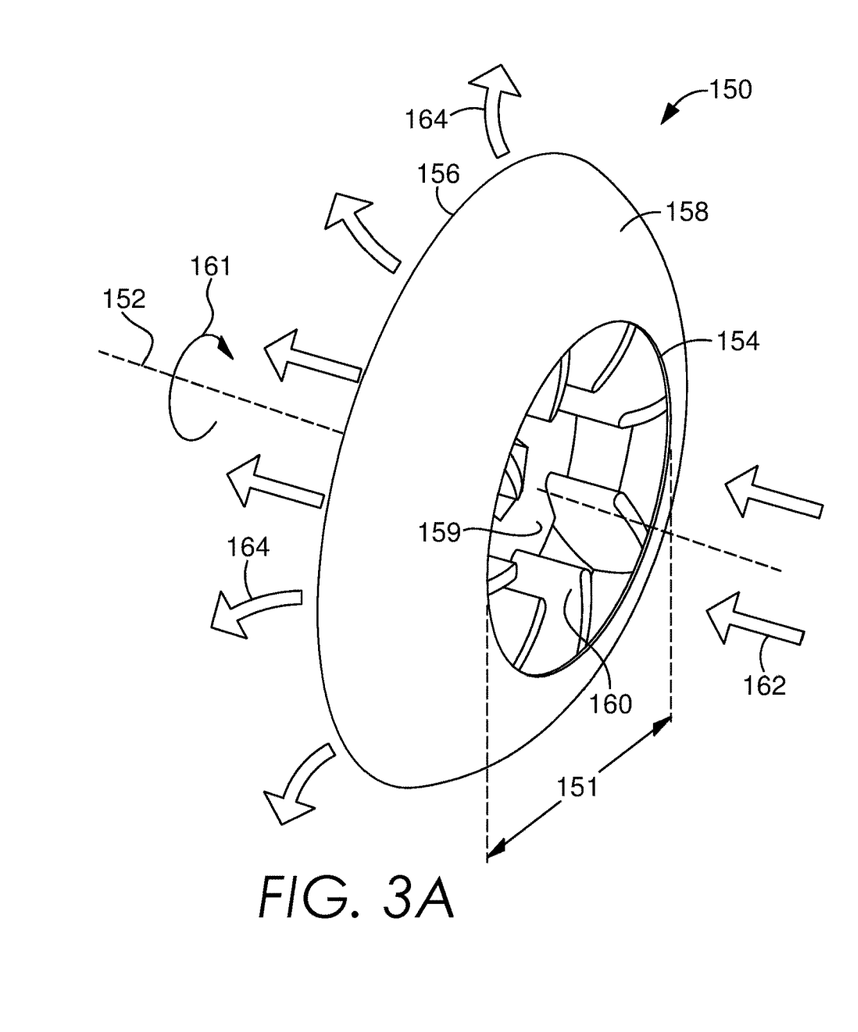
FIG. 3A is a perspective view of an exemplary fan, taken from a first side of the fan, in accordance with aspects hereof.
Figure 3B:
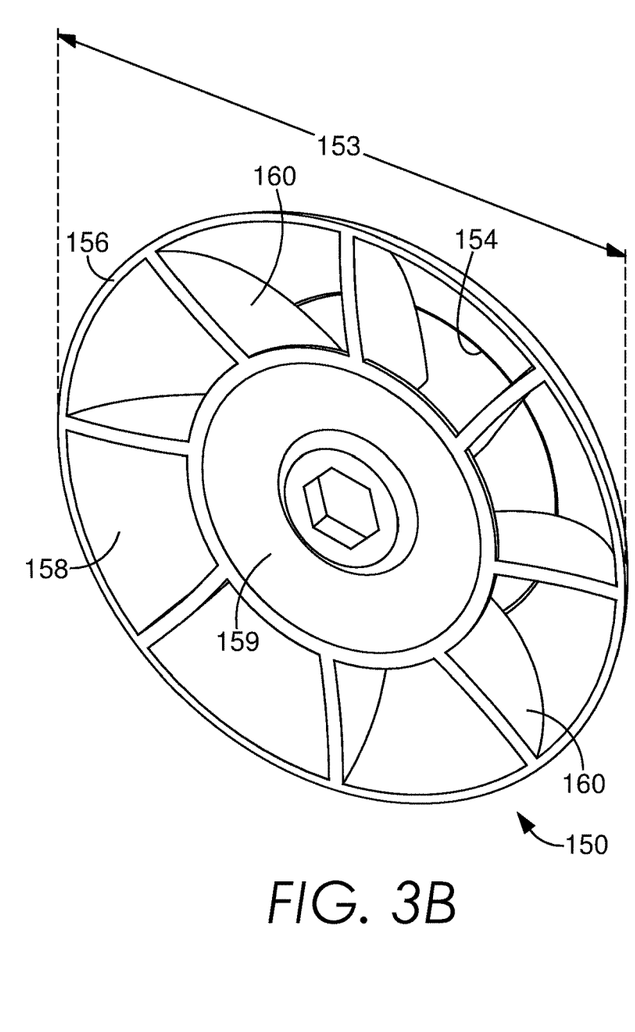
FIG. 3B is a perspective view of the exemplary fan depicted in FIG. 3A, taken from a second side of the fan, in accordance with aspects hereof.

FIGS. 3A and 3B depict an exemplary embodiment of the fan 150. In this exemplary embodiment, the fan 150 is an axial-centrifugal fan. FIG. 3A is a perspective view from an inlet side 154 of the fan and FIG. 3B is a perspective view from a discharge side 156 of the fan. As mentioned above, the inlet side 154 has an inlet-side diameter 151 as defined by an inlet aperture that is less than the discharge-side diameter 153. A shroud 158 connects the inlet side 154 to the discharge side 156, forming a surface that surrounds the inlet side 154 and the discharge side 158. The fan 150 has a plurality of blades 160 connected with and disposed around the shroud 158. The blades 160 may be oriented diagonally along the shroud 158 between the inlet side 154 and the discharge side 156. The blades 160 may additionally extend radially inward (along a curve or diagonal surface formed by the blade shape) from the shroud 158 at the discharge side 156 to a hub 159. The hub 159 may be affixed to a power source via any suitable mechanism (e.g., nut, pin, cap), along the first rotational axis 152 (as shown in FIG. 2). By design, the fan 150 draws air into the inlet side 154 along the first rotational axis 152, and, through rotational energy and the shroud 158, expels the air beyond the hub 159 and radially away from the first rotational axis 152 at the discharge side 156.

FIG. 3A also shows an exemplary airflow created by the fan 150. In some aspects, the blades 160 and shroud 158 form a structure that allows the fan 150 to both draw air into the housing 110 (as depicted in FIGS. 1, 2, 5A and 5B) and to circulate the air through the housing 110. In one aspect, as the fan 150 rotates in a direction indicated by arrow 161, the orientation of the fan blades 160 may draw intake air 162 into the fan 150 at the inlet side 154, in a direction generally parallel to the first rotational axis 152. The orientation of the blades 160 and the shape of the shroud 158 may direct the intake air 162 away from the first rotational axis 152 and force discharge air 164 out of the discharge side 156. Accordingly, the fan 150 forces air into the housing 110 and circulates the air throughout the housing 110 and around the drive assembly 33, the belt 36, and the driven assembly 38.

Figure 4A:
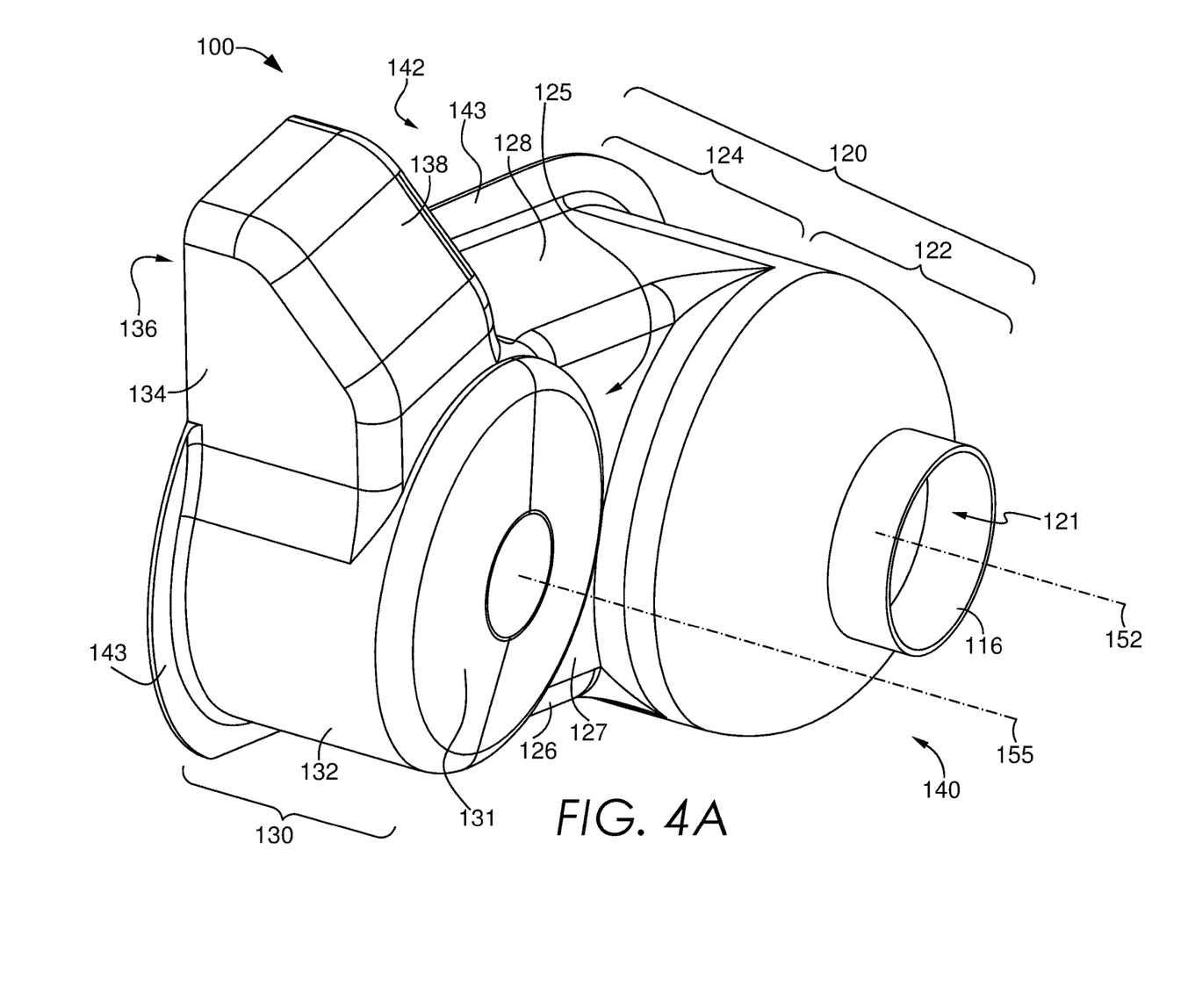
FIG. 4A is a perspective view of an exemplary housing, taken from a first side of the housing, in accordance with aspects hereof.
Figure 4B:
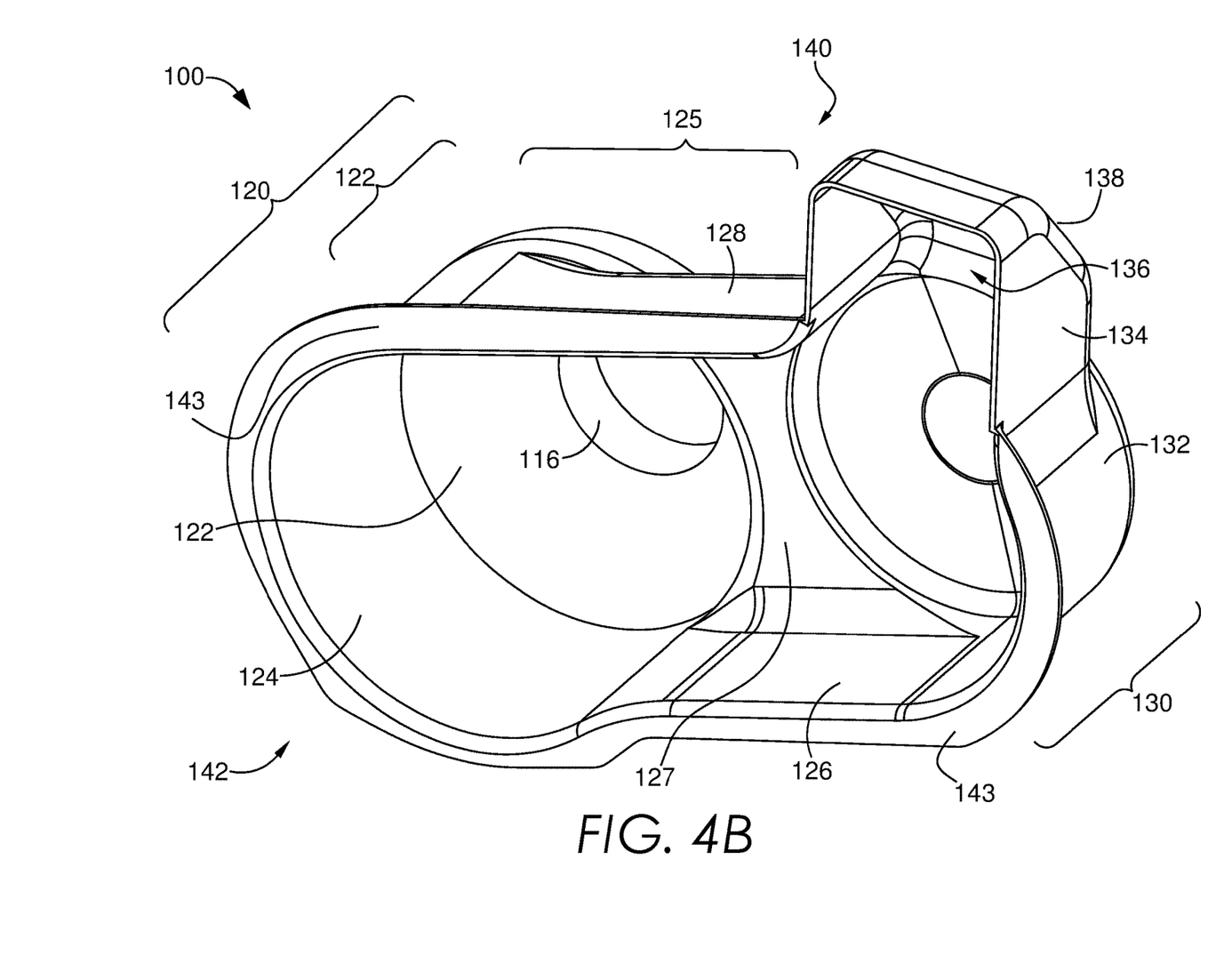
FIG. 4B is a perspective view of the exemplary housing depicted in FIG. 4A, taken from a second side of the housing, in accordance with aspects hereof.

FIGS. 4A and 4B show an exemplary embodiment of the housing 110. FIG. 4A shows the housing 110 as viewed from an intake side 140 of the housing 110, while FIG. 4B shows the housing 110 as viewed from an output side 142 of the housing 110. The housing 110 includes a drive-side chamber 120, an intermediate portion 125 and a driven-side chamber 130.

In this embodiment, the drive-side chamber 120 includes an intake opening 121, which is depicted on the intake side 140 of the housing 110. The drive-side chamber 120 has a first portion 122 surrounding the intake opening 121 and curving radially away from the intake opening 121 and extending toward the output side 142 of the housing 110. The intake opening 121 comprises a lip 116 that connects the housing 110 with ambient air. It is contemplated that a lip may be optional in alternative aspects. In one aspect, the lip 116 may mate with a duct (such as the intake duct designated by reference numeral 16 in FIG. 1) that provides access to the ambient air. The first portion 122 is sized to surround the fan 150 (e.g., as shown in FIG. 2), such that the first portion 122 at least partially surrounds the fan 150. The first portion 122 has a contour that corresponds to the shroud 158 of the fan 150. For instance, the first portion 122 may be substantially spatially parallel to and spaced apart from the shroud 158 of the fan 150.

The drive-side chamber 120 has a second portion 124 connected to the first portion 122 and extending to a flange 143 on the output side 142 of the housing 110. In some embodiments, second portion 124 may be semi-cylindrical, in that the second portion 124 has a surface that curves around the first rotational axis 152. The second portion 124 may also have a contour that corresponds to and may be spaced apart from the drive pulley (e.g., as indicated by reference numeral 34 in FIG. 2). Accordingly, the drive-side chamber 120 may be sized to enclose at least a portion of a drive assembly of the CVT (e.g., as indicated by reference numeral 33 in FIG. 2) and the fan 150 (as shown in FIGS. 2, 3A, and 3B).

The intermediate portion 125 is interposed between the drive-side chamber 120 and the driven-side chamber 130. The intermediate portion 125 may have an intermediate portion face 127 on the intake side 140, and a first wall 126 and a second wall 128 connecting the intermediate portion face 127 and with the flange 143 on the output side 142. Each of the intermediate portion face 127, the first wall 126, and the second wall 128 may connect the drive-side chamber 120 and the driven-side chamber 130.

The driven-side chamber 130 may include driven-side face 131 on the intake side of the housing 140, which may be positioned adjacent to and potentially parallel with the intermediate portion face 127. The driven-side chamber 130 may also have a driven-side wall 132 that curves about the second rotational axis 155, that is connected to the first wall 126 and extends between the driven-side face 131 and the flange 143. The driven-side wall 132 may curve about the second rotational axis 155, and around a circumference of the driven assembly (depicted, e.g., in FIG. 2 and designated by reference numeral 38), from the first wall 126 to an output duct 134. The output duct 134 extends between the driven-side face 131 and the flange 143. In some embodiments, the output duct 134 may have a tapered surface 138, which tapers away from the driven-side face 131 toward the output side 142 of the housing 110. In one aspect, the output duct 134 may connect the driven-side wall 132 and the second wall 128. In other aspects, the output duct 134 may be a part of, or formed in, the driven-side wall 132.

Referring now to the figures collectively, the housing 110 provides an enclosure for a first volume of air surrounding CVT and power source components, including the drive assembly 33, the driven assembly 38, and/or the belt 36. When in the CVT 30 is in operation, friction amongst the CVT components creates heat, which is exchanged from the CVT components to the first volume of air. The first portion 122 encloses a volume of ambient air within the housing 110 that is readily available to displace the first volume of air surrounding the CVT components. Said another way, the first portion 122 provides a volume of ambient air for cooling the CVT components from within the housing 110 itself, before any additional air is drawn into the housing 110 by the fan 150.

As the fan 150 forces additional ambient air into the housing 110, the volume of air within the first portion 122 is circulated around the CVT components, along with the additional ambient air from outside the housing 110. As mentioned above, this process occurs continuously. Each time a second volume of air that is equal to the first volume of air is circulated around the CVT components, a cycle is completed. As a cycle occurs, heat is exchanged from the drive assembly 33, the driven assembly 38, and/or the belt 36 to the circulated air. Simultaneously, the circulated air is forced out of the housing 110 by the ambient air being drawn into the housing 110. The circulated air is forced out of and directed away from the housing 110 via the output opening 136, for example, in the direction of the output side 142.

Further, the output opening 136 may be oriented such that the circulated air is directed around various components of, and away from, the vehicle 10 to aid in cooling other components even beyond the CVT. For example, as shown in FIG. 1, discharge air 19 may be directed around the engine exhaust 17, away from the of the power source 20, and toward a rear of the vehicle 10.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed is:

1. A cooling apparatus for a vehicle having a continuously variable transmission (CVT), the cooling apparatus comprising:

a fan comprising a rotational axis, an inlet side and an discharge side positioned opposite the inlet side, the discharge side having an discharge-side diameter that is greater than an inlet-side diameter; and a housing comprising:
 a chamber sized to enclose at least a portion of the CVT and the fan;
 an intake opening on an intake side of the housing, wherein a rotational axis of the fan extends through the intake opening, and wherein the intake opening is configured to be in fluid communication with a cab of the vehicle; and
 an output opening on an output side of the housing, the output side of the housing opposite the intake side of the housing, wherein the fan is effective to draw air from the cab of the vehicle into the housing through the intake opening and to force the air out of the housing wherein the output opening is radially offset from the rotational axis of said fan, and the direction of flow through said output opening is axially aligned with said rotational axis.

2. The cooling apparatus of claim 1, wherein the fan comprises a plurality of blades extending between the inlet side and the discharge side.

3. The cooling apparatus of claim 2, wherein the fan comprises a shroud that extends from the inlet side to the discharge side and is coupled with the plurality of blades.

4. The cooling apparatus of claim 1, wherein the fan is coupled with an output shaft of a power source.

5. The cooling apparatus of claim 4, wherein a drive pulley is coupled to the output shaft between the fan and the power source, the discharge-side diameter of the fan being greater than a drive pulley diameter of the drive pulley such that the air exiting a discharge side of the fan has a diameter that is greater than the drive pulley diameter.

6. The cooling apparatus of claim 4, wherein the fan is coupled with an output shaft of a power source such that the fan continuously rotates when the output shaft rotates.

7. The cooling apparatus of claim 1, wherein the fan is an axial-centrifugal fan.

8. A housing for a continuously variable transmission (CVT), the housing comprising:
 a drive-side chamber comprising:
  an intake opening in an intake side of the housing;
  a first portion surrounding the intake opening and extending toward an output side of the housing; and
  a second portion connected to the first portion and extending to a flange at the output side, the second portion having a surface that curves around a first rotational axis extending through the first portion from the intake side to the output side,
  wherein the intake opening is axially aligned with the first rotational axis such that air may be communicated into the drive-side chamber in a first axial direction of the first rotational axis;
 a driven-side chamber comprising:
  driven-side face at the intake side;
  a driven-side wall extending between the driven-side face at the intake side and the flange at the output side, the driven-side wall having a surface that curves around a second rotational axis extending from the intake side of the driven-side chamber to the output side of the driven-side chamber; and
  an output duct adjacent to the driven-side wall, the output duct extending between the driven-side face at the intake side and the flange at the output side, wherein the output duct defines an output opening in the housing,
  wherein the first rotational axis is parallel to the second rotational axis,
  wherein the output opening is radially offset from, and axially aligned with, the second rotational axis such that air may be communicated out from the driven-side chamber in the first axial direction; and
 an intermediate portion interposed between the drive-side chamber and the driven-side chamber, the intermediate portion comprising:
  an intermediate portion face at the intake side;
  a first wall extending between the intermediate portion face at the intake side and the flange at the output side and connecting the second portion of the drive-side chamber and the driven-side wall of the driven-side chamber; and
  a second wall extending between the intermediate portion face at the intake side and the flange at the output side and connecting the second portion of the drive-side chamber and the output duct of the driven-side chamber.

9. The housing of claim 8, wherein the drive-side chamber is configured to at least partially surround a drive assembly of the CVT.

10. The housing of claim 8, wherein the driven-side chamber is configured to at least partially surround a driven assembly of the CVT.

11. The housing of claim 8, wherein the intake opening faces opposite the output opening.

12. The housing of claim 8, wherein the housing encloses a volume of air surrounding a drive assembly and a driven assembly.

13. The housing of claim 12, wherein the first portion is configured to surround a fan coupled with the drive assembly.

14. The housing of claim 13, wherein the first portion is dome-shaped and has a surface that is spatially parallel to a shroud of the fan.

15. The housing of claim 8, wherein the second portion of the drive-side chamber, the intermediate portion, and the driven-side portion enclose a first volume of air surrounding a drive assembly and a driven assembly, and the first portion encloses a second volume of air.

16. The housing of claim 15, wherein the second volume air forces the first volume of air out of the housing via the output duct.

17. The housing of claim 8, wherein a center portion of the intake opening is aligned with the first rotational axis.

18. The housing of claim 8, wherein the drive-side chamber encloses a volume of air that is greater than a volume of air enclosed by the driven-side chamber.

19. The housing of claim 8, wherein the output duct faces an engine exhaust system.

* * * * *

UNITED STATES PATENT AND TRADEMARK OFFICE
CERTIFICATE OF CORRECTION

PATENT NO. : 10,563,751 B2
APPLICATION NO. : 15/491821
DATED : February 18, 2020
INVENTOR(S) : Royce A. Steinert It is certified that error appears in the above-identified patent and that said Letters Patent is hereby corrected as shown below:

In the Claims

• Column 9, Line 18: In Claim 1, delete "wherein" and insert -- through an output opening, --.

Signed and Sealed this
Fifth Day of May, 2020

Andrei Iancu
*Director of the United States Patent and Trademark Office*